United States Patent [19]
Fehrmann et al.

[11] Patent Number: 5,587,258
[45] Date of Patent: Dec. 24, 1996

[54] GALVANIC CELL HAVING IMPROVED CATHODE

[75] Inventors: Gerd Fehrmann, Pirna; Rainer Frömmel, Dresden; Rüdiger Wolf, Rabenau, all of Germany

[73] Assignee: Litronik Batterietechnologie GmbH & Co., Pirna, Germany

[21] Appl. No.: 583,611

[22] Filed: Jan. 5, 1996

[51] Int. Cl.$^6$ .............................. H01M 4/56; H01M 4/50
[52] U.S. Cl. ........................................... 429/228; 429/224
[58] Field of Search ..................... 429/224, 228

[56] References Cited

U.S. PATENT DOCUMENTS

| | | |
|---|---|---|
| 3,658,592 | 4/1972 | Dey . |
| 3,853,627 | 12/1974 | Lehmann et al. . |
| 4,310,609 | 1/1982 | Liang et al. . |
| 4,391,729 | 7/1983 | Liang et al. . |

FOREIGN PATENT DOCUMENTS

| | | |
|---|---|---|
| 146201 | 6/1985 | European Pat. Off. . |
| 2154092 | 11/1976 | Germany . |
| 2726380 | 12/1978 | Germany . |
| 3031902 | 3/1981 | Germany . |

OTHER PUBLICATIONS

Solar, R. J., "Comparison of accelerated test methods to determine capacity of Lithium Silver Chromate pacemaker batteries", *Proc. of the Symp. on Lithium Batteries*, vol. 81–4, 1981, pp. 310 to 322 (no month).

*Lithium Batteries*, Gabano, I. P., Ed., Academic Press, 1983, (no month) "Lithium–Manganese Dioxide Cells", Ikeda, pp.169 to 210.

Primary Examiner—John S. Maples
Attorney, Agent, or Firm—Spencer & Frank

[57] ABSTRACT

A sealed galvanic cell which has high power and energy densities, a low self discharge, and an open circuit voltage which is related to state of discharge, and which is useful for supplying electrical power to an implantable device, such as a defibrillator and a nerve stimulator, with a large current consumption, and method of making same. The galvanic cell includes a casing; a cathode unit having at least one electrode composed of a mixture of at least one metal oxide and at least one lead compound; an anode unit having at least one electrode comprised of an alkali metal; and an organic electrolyte comprised of a mixture of (a) ethylene- and/or propylene carbonate, (b), 2-dimethoxyethane, and (c) a conducting salt. The mixture of the cathode unit is one of (a) a mixture of $CrO_x$ (x=2.5 to 2.7) and at least one lead compound from among $PbCrO_4$, $PbMoO_4$ and $PbO$, (b) a mixture of $CrO_x$ (x=2.5 to 2.7), $MnO_2$, and at least one lead compound from among $PbCrO_4$, $PbMoO_4$ and $PbO$, or (c) a mixture of $MnO_2$ and $PbO$. The at least one lead compound is present in an amount of, for example, 3 to 15 mol %, so that the mean slope of the open circuit voltage after the time just before reaching the end of discharge at which at least 10 % of capacity remains is greater than the mean slope prior thereto.

12 Claims, 8 Drawing Sheets

GALVANIC CELL HAVING IMPROVED CATHODE

BACKGROUND OF THE INVENTION

1. Field of the Invention

This invention relates to a galvanic cell with high energy and power density, low self discharge, and an open circuit voltage (OCV) which is related to the state of discharge, and to a method of manufacturing such a galvanic cell.

Such a sealed galvanic cell is suitable as an electrical power supply for implantable medical devices with characteristically large current consumptions, such as defibrillators and nerve stimulators. Cells used for implantable devices must be reliable and sealable, self discharge has to be low, and energy density and power density have to be high. Of utmost importance are the discharge characteristics of the cell which should allow a rating of the state of discharge. Precise recognition of the open current voltage just prior to the end of discharge is particularly desired.

2. Description of the Related Art

Prior art power supplies for biomedical applications which allow the determination of the state of discharge under load include those having cathodes comprised of silver compounds, such as argentous chromate, $Ag_2CrO_4$, known from U.S. Pat. No. 3,853,627, and those comprised of silver oxide and vanadium oxides known from U.S. Patent Nos. 4,310,609 and 4,391,729. $Li/Ag_2CrO_4$ batteries known, for example, from U.S. Pat. No. 3,853,627, are well known as long life power sources for pacemakers. By using only the lowest currents, however, the usable energy of such batteries can be reduced to 60% of the theoretical value. As known from Solar, R. J., "Comparison of accelerated test methods to determine capacity of Lithium Silver Chromate pacemaker batteries", *Proc. of the Symp. on Lithium Batteries*, Vol. 81–4, 1981, pages 310 to 322, complete reduction of chromium (VI) is undesirably suppressed by the presence of silver metal produced by reduction of silver ions to silver metal. This problem therefore has to be taken into account when silver salts are employed in batteries.

Using $Ag_2CrO_4$ or $Ag_2MoO_4$, high power batteries with higher energy densities have been built. Solubility of these silver salts in the required organic solvents is too high, however. Therefore, self discharge by direct chemical reaction of $CrO_4^-$ or $MoO_4^-$ with metallic lithium at the anode cannot be lowered below 1 $\mu W/cm^2$.

$Li/MnO_2$ batteries are widely used as high power energy sources. These batteries are sealable and can supply loads of up to several milliamps per square centimeter as known from *Lithium Batteries*, Gabano, I.P., Ed., Academic Press, 1983, pages 169 to 210. The discharge characteristics of $Li/MnO_2$ batteries do not reflect the state of charge, however, and the open circuit voltage (OCV) is about 3 V even immediately before the end of discharge (EOD). In German Patent Application No. 2,726,380 (published before examination), a cathode containing $CrO_x$ is described in which x ranges from 2.0 to 2.9. Batteries with such cathodes likewise show a nearly constant discharge voltage until reaching the end of discharge, however. This publication additionally describes additives including $PbO_2$ or $MnO_2$ which give the same redox-potential.

U.S. Pat. No. 3,658,592 and German Patent Application No. 2,154,092 (published after examination) describe batteries having cathodes made from metal chromates, such as $PbCrO_4$. Batteries with low self discharge rates can be built due to the low solubility of $PbCrO_4$ in organic solvents. These batteries are only suitable for low rate applications ($\leq 2$ $mA/cm^2$), however, and have a voltage of about 2 V which is low and which is not sufficient for defibrillators or nerve stimulating devices.

An object of the present invention is therefore to provide an improved cathode material suitable for the above-mentioned kind of batteries which can supply a load of more than 20 $mA/cm^2$ at a voltage above 1.5 volts, which has a self discharge below 0.1 $\mu W/cm^2$, which has cathode constituents selected to provide the desired discharge characteristic, as well as a precise recognition of the end of discharge, such as from a change in slope of the open circuit voltage, and which is sealed.

It is a further object of the present invention to provide a method for producing a novel galvanic cell.

It is yet another object of the present invention to provide a method for supplying electrical power to an implantable device by employing the novel galvanic cell according to the invention.

SUMMARY OF THE INVENTION

The present invention accomplishes these and other objects by providing a galvanic cell which has a high energy density, a high power density, a low self discharge, and an open circuit voltage which is related to state of discharge, and which is useful for supplying electrical power to a device which has a large current consumption and which is implantable in a living being including a defibrillator and a nerve stimulator, the galvanic cell comprising: a casing; a cathode unit having at least one electrode and, when a plurality of electrodes are provided, the electrodes of the plurality are separated and are electrically connected to one another, which at least one electrode of the cathode unit is comprised of a mixture of at least one metal oxide and at least one lead compound, which mixture is selected from the group consisting of: (a) a mixture of $CrO_x$ in which x ranges between 2.5 and 2.7 and at least one lead compound which is selected from the group consisting of $PbCrO_4$, $PbMoO_4$ and PbO, (b) a mixture of $CrO_x$ in which x ranges between 2.5 and 2.7, $MnO_2$, and at least one lead compound which is selected from the group consisting of $PbCrO_4$, $PbMoO_4$ and PbO, and (c) a mixture of $MnO_2$ and a lead compound which is PbO; an anode unit having at least one electrode comprised of an alkali metal and, when a plurality of electrodes are provided, the electrodes of the plurality are separated and are electrically connected to one another, which at least one electrode of the anode unit is placed one of near the at least one electrode of the cathode unit or between respective electrodes of the cathode unit; and an organic electrolyte comprised of a mixture of (a) at least one ester selected from the group consisting of ethylene carbonate and propylene carbonate, (b), 2-dimethoxyethane, and (c) a conducting salt.

The casing advantageously includes a bottom, a cover, and sealing means positioned between the bottom and the cover for hermetically sealing the galvanic cell from external environmental influences. Preferably, the bottom and the cover of the casing are comprised of metal and are electrically conductive. Then, the casing is advantageously connected electrically to the anode unit, and the electrodes of the plurality of electrodes of the cathode unit are electrically connected to one another in parallel, and the electrodes of the plurality of electrodes of the anode unit are electrically connected to one another in parallel. The casing may be provided with a glass feedthrough for electrical connection means.

The galvanic cell may further comprising at least one separator positioned between the at least one electrode of the anode unit and the at least one electrode of the cathode unit. Preferably, the at least one separator is electrically insulating, porous, and is impregnated with the organic electrolyte.

The at least one electrode of the cathode unit advantageously further comprises a binder, such as, for example, TEFLON as a powder or as a dispersion in a liquid, and at least one additive which is electrically conductive and which is selected from the group consisting of carbon black, acetylene black, and graphite. Preferably, the at least one electrode of the cathode unit is porous and has a porosity ranging between about 30 and about 50%. Further, the at least one electrode of the cathode unit is impregnated with the organic electrolyte.

Preferably the alkali metal of the at least one electrode of the anode unit is lithium.

Preferably, the organic electrolyte comprises: from about 20 to about 60% of ethylene carbonate; from about 5 to about 20% of propylene carbonate; and from about 30 to about 70% of 2-dimethoxyethane. Preferably, the conducting salt of the organic electrolyte is $LiClO_4$ and is present in an amount ranging from about 0.8 to about 1.5 mol/l.

The galvanic cell has an open circuit voltage having a mean slope, and a capacity and an end of discharge characteristic such that at least 10% of capacity remains at a time just before reaching the end of discharge. Then, the cathode constituents are selected to provide the desired discharge characteristic, including a precise recognition of the end of discharge, such as from a change in slope of the open circuit voltage. Thus, advantageously and in accordance with a most preferred embodiment of the invention, the at least one lead compound is present in an amount in the mixture of the at least one electrode of the cathode unit so that the mean slope of the open circuit voltage after the time just before reaching the end of discharge is greater than the mean slope prior to the time just before reaching the end of discharge. Preferably, the at least one lead compound is present in the mixture of the at least one electrode of the cathode unit in an amount ranging from about 3 to about 15 mol %.

The present invention further accomplishes these and other objects by providing a method of producing such a galvanic cell, comprising: providing a cathode unit having at least one electrode and, when a plurality of electrodes are provided, the electrodes of the plurality are separated and are electrically connected to one another, which at least one electrode of the cathode unit is comprised of a mixture of at least one metal oxide and at least one lead compound, which mixture is selected from the group consisting of: (a) a mixture of $CrO_x$ in which x ranges between 2.5 and 2.7 and at least one lead compound which is selected from the group consisting of $PbCrO_4$, $PbMoO_4$ and PbO, (b) a mixture of $CrO_x$ in which x ranges between 2.5 and 2.7, $MnO_2$, and at least one lead compound which is selected from the group consisting of $PbCrO_4$, $PbMoO_4$ and PbO, and (c) a mixture of $MnO_2$ and a lead compound which is PbO; providing an anode unit having at least one electrode comprised of an alkali metal and, when a plurality of electrodes are provided, the electrodes of the plurality are separated and are electrically connected to one another; positioning the cathode unit and the anode unit within a casing so that the at least one electrode of the anode unit is placed one of near the at least one electrode of the cathode unit or between respective electrodes of the cathode unit and so that the at least one electrode of the anode unit is electrically insulated by at least one separator placed adjacent thereto; filling the casing with an organic electrolyte comprised of a mixture of (a) at least one carbonate selected from the group consisting of ethylene carbonate and propylene carbonate, (b), 2-dimethoxyethane, and (c) a conducting salt; and sealing the casing hermetically from environmental influences.

Preferably, the cathode unit is provided by preparing the mixture of at least one metal oxide and at least one lead compound; providing a collector which is comprised of metal; pressing the mixture onto the collector; and covering the collector with a separator.

In one embodiment of the method, the mixture of at least one metal oxide and at least one lead compound is prepared by grinding the at least one metal oxide to a grain size below 100 µm; mixing the at least one metal oxide after grinding with at least one lead compound, an additive which is electrically conductive, and a binder.

In another embodiment of the invention, the mixture of at least one metal oxide and at least one lead compound is prepared by grinding the at least one metal oxide to a grain size below 100 µm; mixing the at least one metal oxide, an additive which is electrically conductive, and a binder to provide a first composition; dissolving equimolar amounts of a soluble lead salt and one of a soluble chromate salt or a soluble molybdate salt in water to provide an aqueous solution of one of $PbCrO_4$ or $PbMoO_4$; adding the aqueous solution to the composition and causing precipitation of one of $PbCrO_4$ or $PbMoO_4$ from the aqueous solution to provide a second composition; separating the second composition from the water to provide the mixture; and cleaning the mixture by contacting same with pure water. Advantageously, the soluble lead salt is $Pb(NO_3)_2$, the soluble chromate salt is $K_2CrO_4$, and the soluble molybdate salt is $(NH_4)MoO_4$.

In a further embodiment of the invention, the mixture of at least one metal oxide and at least one lead compound is prepared by sintering one of $CrO_x$ or $CrO_3$ with at least one lead compound selected from the group consisting of PbO or $Pb(NO_3)_2$ at a sintering temperature ranging from about 250° C. to about 300° C. to provide a sintered product; grinding the sintered product to provide a ground product having a grain size of <100 µm; washing the ground product with water to provide a washed product; mixing the washed product with an additive which is electrically conductive, a binder, and water to provide a slurry; and adding $MnO_2$ to the slurry. Preferably, the lead compound comprises $Pb(NO_3)_2$ which decomposes to PbO below the sintering temperature.

The present invention further accomplishes these and other objects by providing a method of supplying electrical power to a device which is comprised of a gas tight casing and one of a heart defibrillator or a nerve stimulator positioned within the gas tight casing, and which is implantable in a living being, the method comprising: manufacturing a galvanic cell according to claim 1; positioning the galvanic cell within the gas tight casing; and electrically connecting the galvanic cell to the one of a heart defibrillator or a nerve stimulator thereby providing electrical power thereto.

The measures described in this invention provide an advantageous way to determine the nearly exhausted capacity of the battery in due time even at open circuit (OC) before the end of discharge (EOD) is reached. From the open circuit voltage (OCV), conclusions can be drawn according to the present invention, to the voltage under high load, which applies during a defibrillating pulse discharge. This is of utmost importance because the voltage of the battery cannot be measured directly under load due to the unacceptable condition this presents to the living being hosting the implant, i.e., the patient.

The cathode contains, according to the invention, a mixture of $CrO_x$ or $CrO_x$ plus $MnO_2$ with $PbCrO_4$, $PbMoO_4$ or PbO, a mixture of PbO and $MnO_2$. The metal oxides with their relatively good electrical conductance provide electrodes having an open circuit voltage (OCV) of 3 V, which can stand high loads. By using carbon black, acetylene black, and/or graphite the conductivity can be increased, and a conducting matrix for the nonconducting lead salts provided. The lead compounds are reduced at the end of discharge (EOD) below 2.5 V. Blocking of the electrode by deposited metal, as observed in silver salt containing cells, is prevented since the lead compounds are reduced to metallic lead only at the end of discharge. This is contrasted with cells containing mixtures of $MnO_2$ or $CrO_x$ with silver salts in which the silver ion will be reduced at voltages above 3 volts before the reduction of $MnO_2$ or $CrO_x$, which can result in blocking of the electrodes.

The solubility of the cathode materials described herein, as well as the solubility of the discharge products, in the ether-based, highly conductive electrolytes employed is extremely low so that self discharge rates below 0.1 $\mu W/cm^2$ are achieved. Moreover, the discharge characteristics can be influenced by varying the content of the lead compound(s) in the cathode. Their content is limited in this invention to about 3 to about 15 mol %, because the nonconductive lead compounds reduce the power density of the electrode. Then one achieves electrodes which supply a load of up to 30 $mA/cm^2$ with a battery voltage of 1.5 V at 37° C.

The cathode material is produced by mixing dry or wetted components. Especially advantageous is the addition of a solution of the lead salts to the mixture. Then, a very homogenous, finely crystallized distribution of $PbCrO_4$ or $PbMoO_4$ can be achieved by precipitation of these materials from a solution of an alkali- or ammonium chromate or molybdate. The cathode material has to be washed carefully before use, however, to remove the alkali hydroxide or ammonium hydroxide produced.

Another form of the cathode may be produced by heating $CrO_x$, especially if $CrO_3$ is heated together with PbO or another, easily pyrolyzed compound, up to about 300° C. Unused amounts of $CrO_3$, which could raise the self discharge of the cell, are advantageously converted to insoluble $PbCrO_4$ by PbO.

BRIEF DESCRIPTION OF THE DRAWING

These and other advantageous embodiments of the invention are given in the claims and are shown in the drawing taken with the description of the preferred embodiments of the invention in which:

DESCRIPTION OF THE PREFERRED EMBODIMENTS

Figure 1:
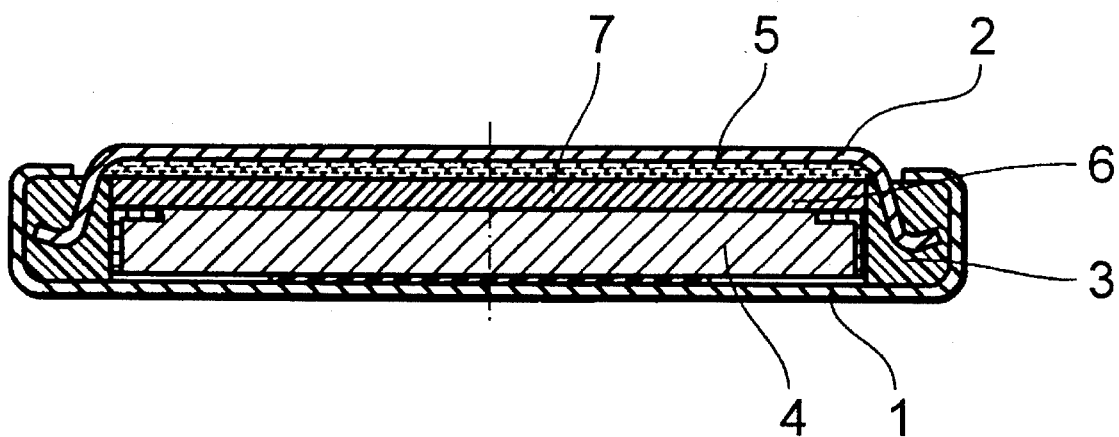
FIG. 1 is a cross-sectional view of a galvanic cell according to the invention known as a button cell.

Example 1 shows a single cell produced according to the procedures described in this invention in a cross-sectional view.

A cathode 4 and an anode 5 are shown separated by a separator 6. This assembly is placed between bottom 1 and cover 2 which are connected to each other with a sealing ring 3 made of an insulating material. Bottom 1 provides the minus-polarity and cover 2 the plus-polarity of the galvanic cell. The chemical compositions of the anode, cathode and separator are described in more detail below using an example.

Figure 2:
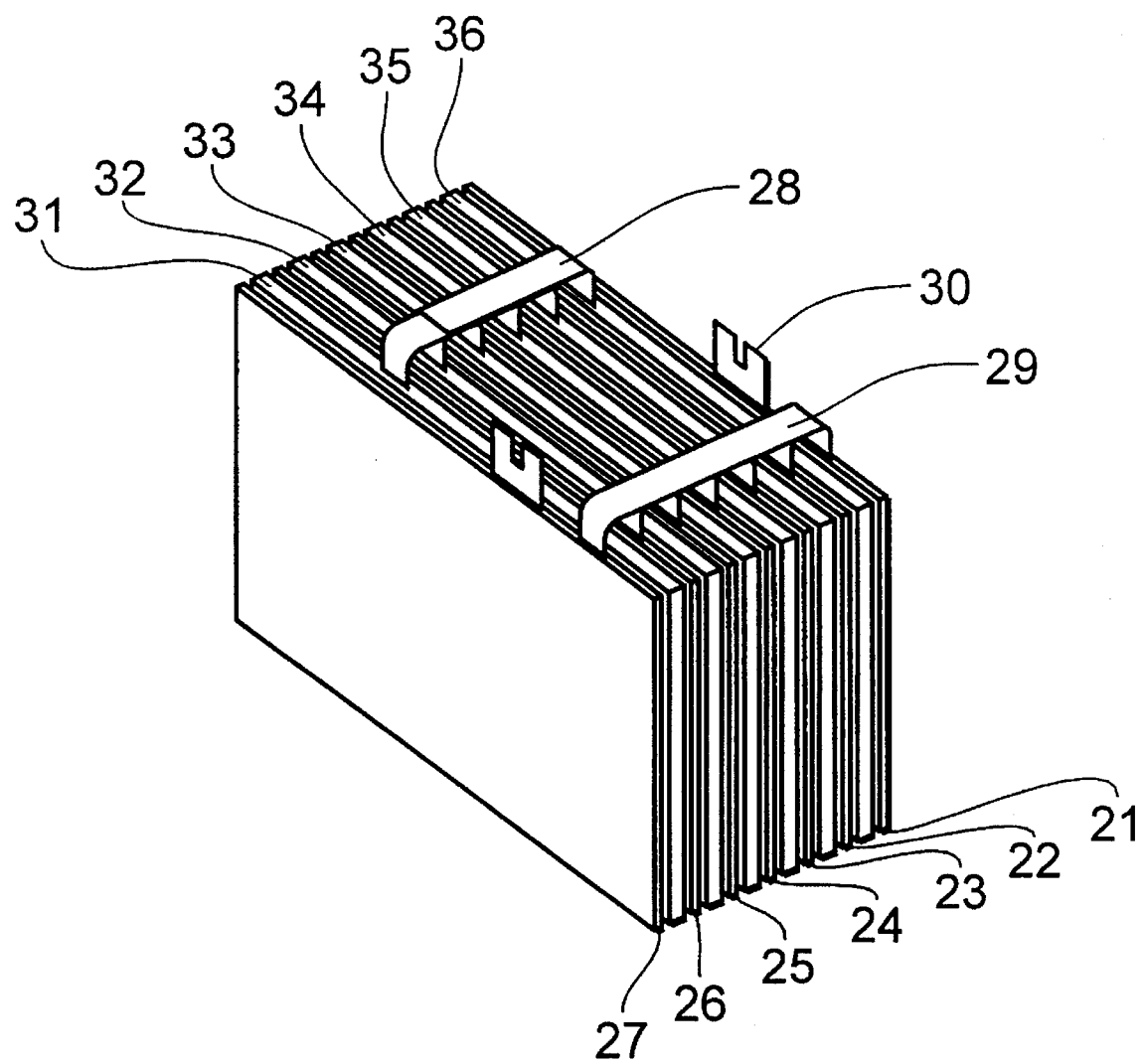
FIGS. 2, 2a and 2b are perspective views of another example of a galvanic cell according to the invention.
Figure 3:
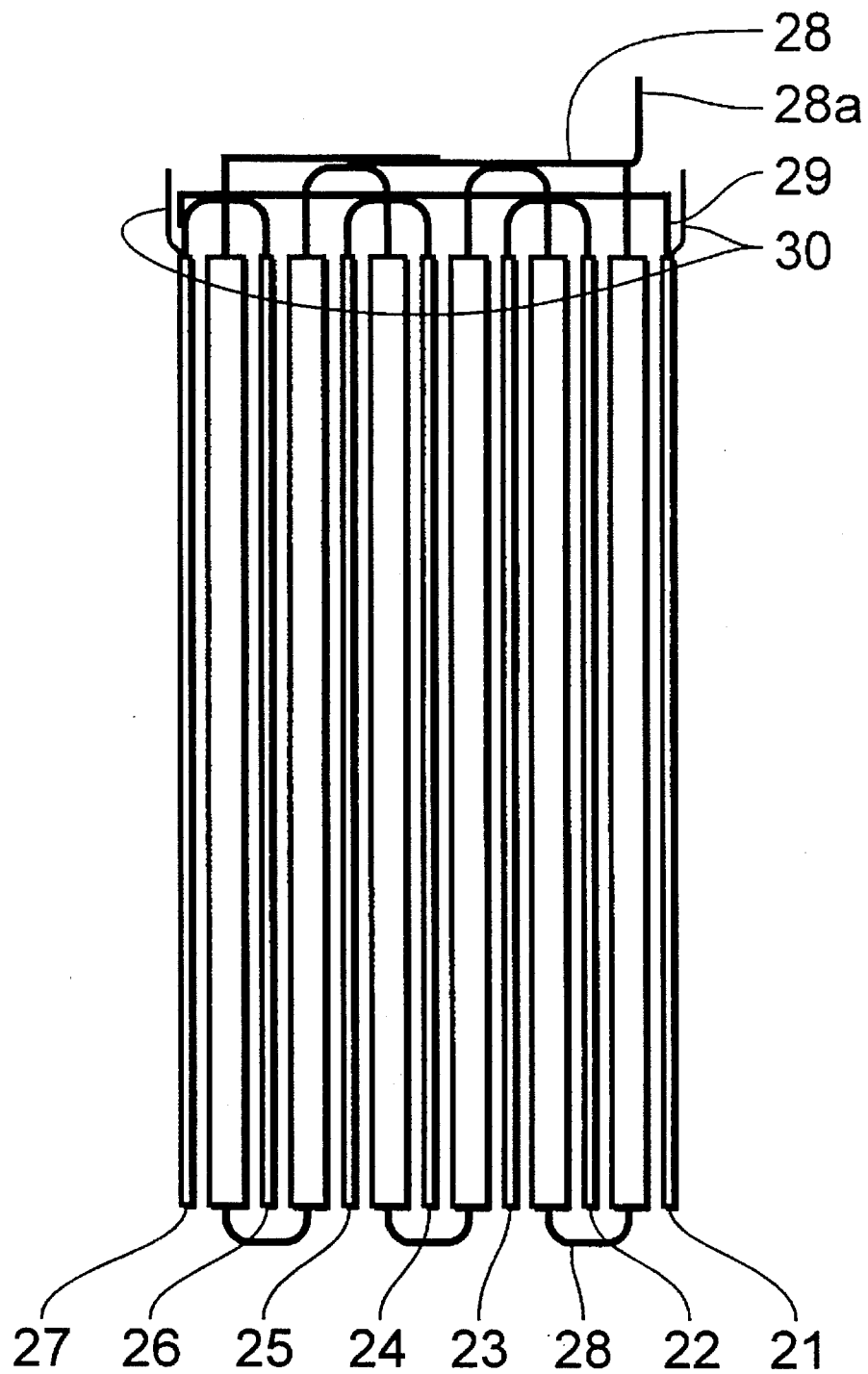
FIG. 3 is a side view of the electrode arrangement of FIG. 2.

FIGS. 2 and 3 show, respectively, a perspective view of another example of a galvanic cell according to the invention and a side view thereof. Seven anodes 21 to 27 are illustrated and are connected in parallel by anode connectors 29. Six cathodes 31-36 are illustrated and are connected in parallel by cathode connectors 28. The outer anode is supported by anode connector 30. The nature and production of the electrode materials and electrodes are described in more detail below in Example 2.

The following examples illustrate the production steps for producing galvanic cells according to the invention:

EXAMPLE 1

The production of the cell shown in FIG. 1 is described in detail below:

5 g of $CrO_x$, produced by heating $CrO_3$ at 300° C. for 1 hour, was mixed with 5 g $MnO_2$, 2 g $PbMoO_4$, 0.7 g acetylene black (carbon), and 0.5 g TEFLON powder. The mixture was dried at 250° C., ground in a mill, and separated from the fraction of particles >100 μm by using a sieve. This mixture was pressed in a steel mould of 16 mm diameter with a force of 75 kN into a cylindrical tablet having a thickness of 1.6 mm to form a $CrO_x/MnO_4/PbMoO_4$ cathode 4 as shown in FIG. 1 and was pressed into a button cell R 2032 having a diameter of 20 mm and a thickness of 3.2 mm as shown in FIG. 1. A cylindrical lithium disc having a diameter of 16 mm and a thickness of 0.65 mm formed an anode 5. A separator 6 made of polypropylene was laid on top of the cathode 4 and was impregnated with electrolyte 7. The cathode tablet 4 was impregnated with electrolyte 7 using an applied vacuum to draw in the electrolyte 7, and later the anode 5 was positioned on top of the separator 6. The galvanic cell was sealed by positioning a polypropylene sealing ring 3 between the bottom 1 and the cover 2 of the button cell and pressing the cover 2 onto the sealing ring 3.

The electrolyte was prepared to contain 30 weight % ethylene carbonate (EC), 10 weight % propylene carbonate (PC) 60 weight %, 2-dimethoxyethane, (DME), and 1 mole/l of $LiClO_4$ as a conducting salt. The water content was below 50 ppm as determined by a Karl Fischer titration.

A cell having an open circuit voltage of 3.4 V (+ or −0.1 V) and having an impedance of 20 ohm (+ or−5 ohm) at 37° C. was obtained. Capacity of the galvanic cell was measured using a discharge regime and pulsed discharges in which four pulses of 10 s with 15 $mA/cm^2$ each and 15 s intervals between pulses were employed, and the pulse cycle was repeated after a 30 min break.

Figure 4:
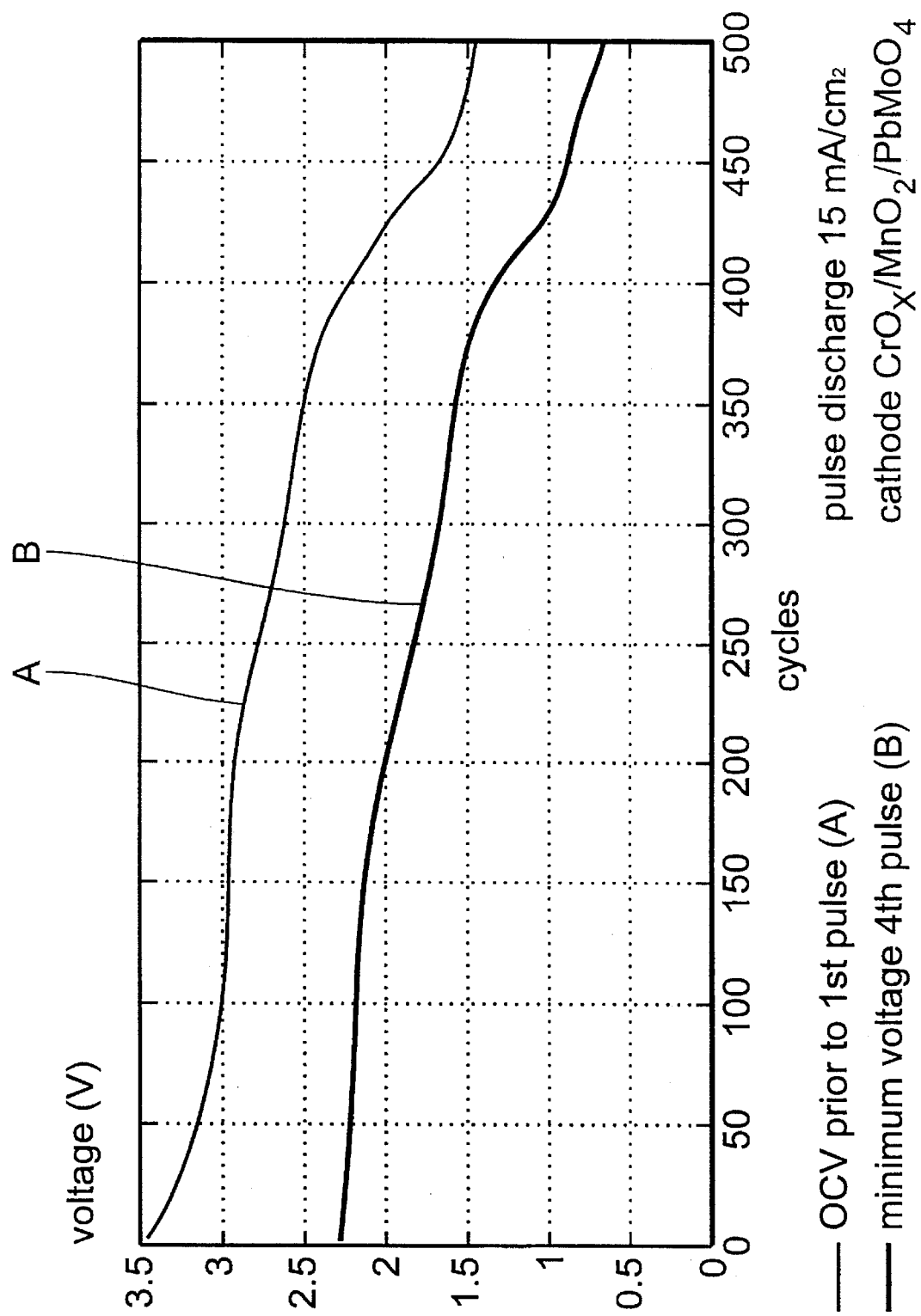
FIG. 4 is a time/voltage diagram to demonstrate the discharge characteristics of a galvanic cell according to FIG. 1 (Example 1) of the invention.

End of discharge (EOD) was defined as being reached if the voltage drops below 1.5 V during pulsed discharge. The cell according to this example achieved 375 cycles (see curve B in FIG. 4) and this corresponds to a capacity of 125 mAh. The discharge characteristics are shown in FIG. 4 which is a time/voltage diagram and shows voltage versus the number of pulsed discharge cycles. Curve A shows the open circuit voltage of the cell before the first pulse of each cycle. Curve B shows the minimum voltage of the fourth pulse of each cycle.

Obviously there is a lowering of the open circuit voltage (OCV) after 150 cycles before putting the battery under load (curve A). Until the end of discharge (EOD), which is reached if the voltage falls below 1.5 V during discharge, the open circuit voltage (OCV) falls at least 500 mV compared to a battery at the middle of discharge (MOD). This lowering of OCV can be used to determine the remaining, available capacity. That is, the slope of curve A increases just before EOD compared to the previous slope thereof.

EXAMPLE 2

The production of the cell shown in FIGS. 2 and 3 is described in detail below:

14 g of $MnO_2$ were mixed respectively with 0, 1.0, 1.4, or 1.8 g of PbO, 1 g of acetylene black, 0.5 g of graphite, and 0.6 g of a TEFLON dispersion, and water added until a homogenous mixture was obtained. The respective masses were pasted onto respective cathode collectors (cf. the-grid 31a of cathode 31 in FIG. 2b) to provide respective preforms of six cathodes 31–36 each and were dried. These electrode preforms were densified by pressing with a force of 75 kN after drying to provide the six cathodes 31–36.

Seven anodes 21–27 were produced by pressing lithium foil onto respective collector grids. (In FIG. 2b the collector grid 27a of anode 27 is shown). The six cathodes 31–36 and the seven anodes 21–27 each were imbedded within separators (bags - cf. bags 27b and 31b of anode 27 or cathode 31, respectively, in FIG. 2b) made of polypropylene. An assembly containing six $MnO_2$ cathodes containing no PbO (0 mol % PbO, not in accordance with the invention) was made for comparison and three respective assemblies containing six $MnO_2$/PbO cathodes 31–36 containing PbO in amounts of 4.5, 6.0, and 7.5 mol % in accordance with the invention were made.

Figure 2A:
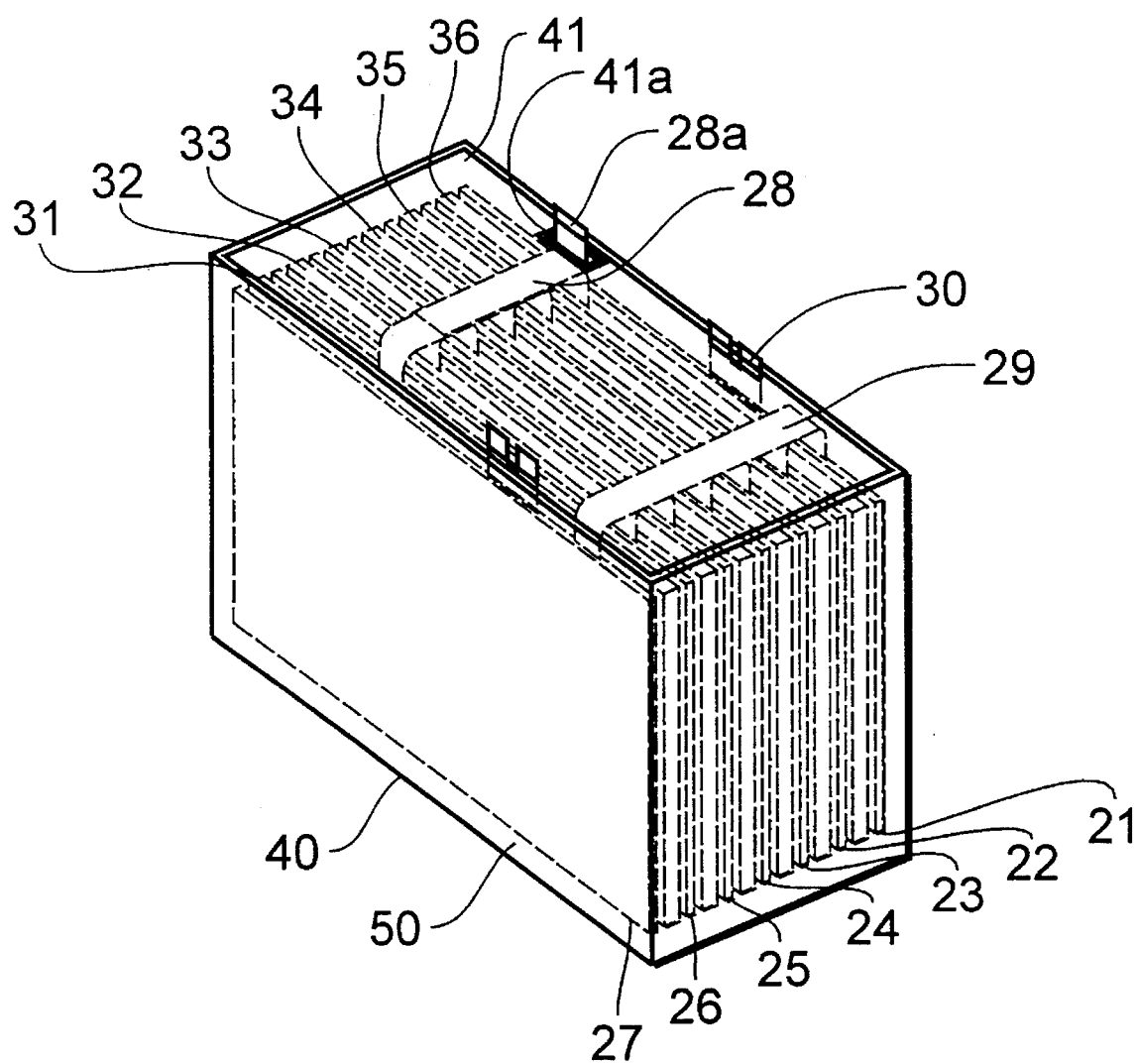
Figure 2B:
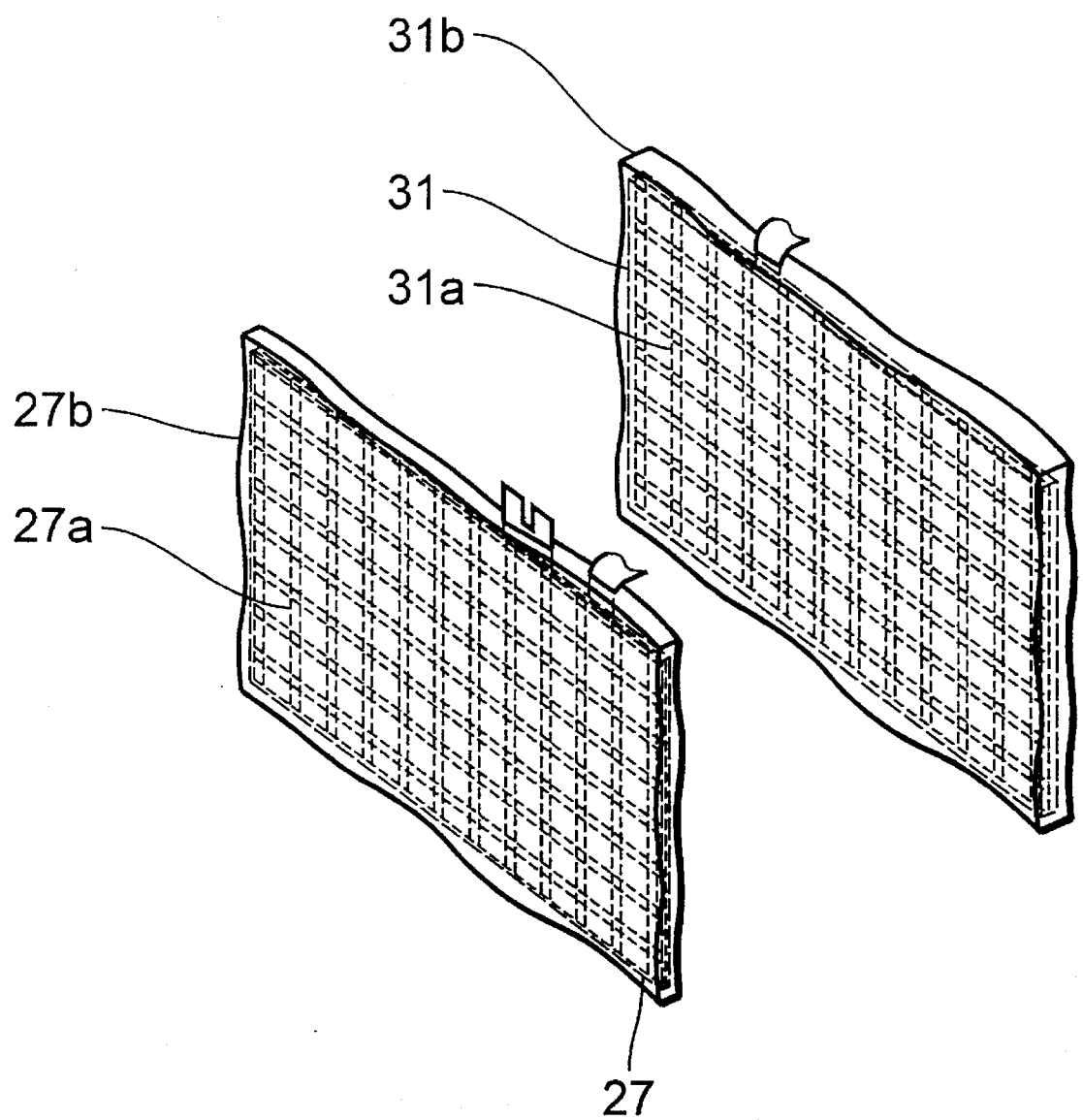

These electrode assemblies were each put into a casing 40 made of Cr—Ni—steel as shown in FIG. 2a. The anode current connectors 29, 30 were spot-welded to the casing. The cathode current connectors 28 were spot-welded to an insulated wire 28a, which is connected to a glass feedthrough 41a in the cover 41 of the casing 40.

The batteries were filled with an electrolyte mixture 50 containing 50% propylene carbonate, 50%, 2-dimethoxyethane, and 1 mol/l $LiClO_4$ as a conducting salt. The water content was below 50 ppm and the batteries was sealed by laser welding the bottom 40 and cover 41 thereof (not shown).

Capacity of these galvanic cells was determined according to the regime given in Example 1. Current density during discharge was 21 mA/cm$^2$. 70 cycles were achieved before reaching 1.5 V (EOD, see curve B in FIG. 5) and this corresponds to a capacity of 1.5 Ah.

Figure 5:
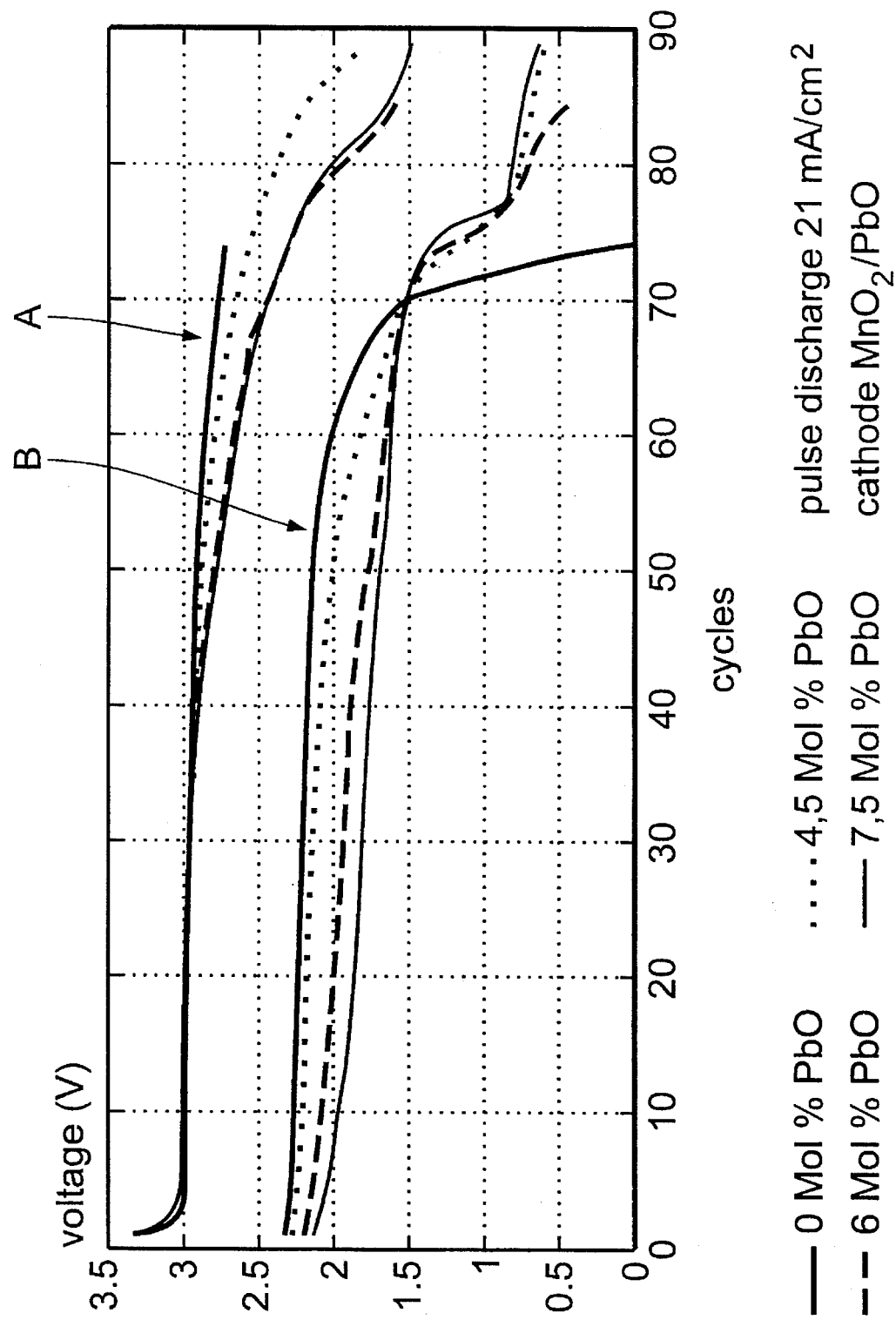
FIG. 5 is another time/voltage diagram to demonstrate the discharge characteristics of a galvanic cell according to FIGS. 2, 2a, 2b and 3 (Example 2) of the invention, and FIG. 6 schematically shows a heart defibrillator arrangement.

The discharge characteristics are shown in FIG. 5 which is a time/voltage diagram and shows voltage versus the number of pulsed discharge cycles for each of the batteries. Curve A shows the open circuit voltage of the batteries before the first pulse of each cycle. Curve B shows the minimum voltage of the fourth pulse of each cycle.

From FIG. 5, it is obvious in which manner the OCV (curve A) is lowered with increasing PbO content of the cathode mixture before the battery is pulse loaded (curve B). In the same way, the increasing PbO content lowers the load capacity of the battery. From FIG. 5, one can see that there is a range of maximum benefit from the addition of PbO into the cathode mixture according to the invention, which represents a compromise between maximum load capability and minimum OCV lowering necessary for a safe determination of EOD. Again, the lowering of OCV can be used to determine the remaining, available capacity. That is, the slope of curve A increases just before EOD compared to the previous slope thereof.

Figure 6:
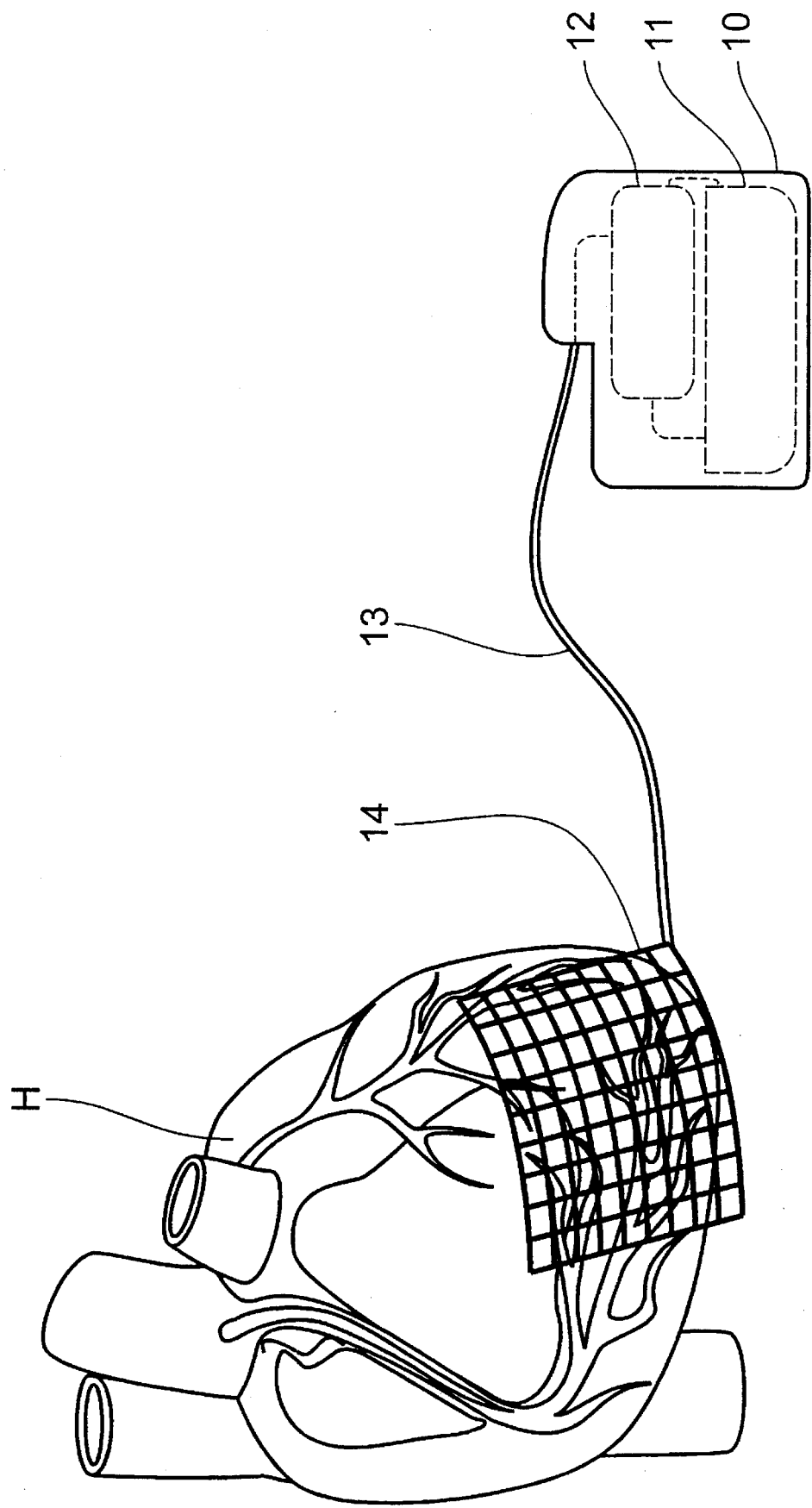

Use of the cell according to this invention takes place within pacemakers/defibrillators in such a way that the cell is combined with the electrical circuits thereof in a metal casing. The electrode connectors for pulsing are made like plug in contacts. FIG. 6 shows schematically such an arrangement of a cell 11 serving as a power source and being connected, to a defibrillator unit 12. Both the cell 11 and the defibrillator unit 12 are contained in a gas-tight casing 10, and an electrode lead 13 connects the defibrillator to a defibrillation electrode 14 being placed adjacent to a heart H.

It is understood that various other modifications will be apparent to and can be readily made by those skilled in the art without departing from the scope and spirit of the present invention. Accordingly, it is not intended that the scope of the claims appended hereto be limited to the description set forth above but rather that the claims be construed as encompassing all of the features of patentable novelty which reside in the present invention, including all features which would be treated as equivalents thereof by those skilled in the art to which the invention pertains.

What is claimed is:

1. A galvanic cell which has a high energy density, a high power density, a low self discharge, and an open circuit voltage which is related to state of discharge, and which is useful for supplying electrical power to a device which has a large current consumption and which is implantable in a living being including a defibrillator and a nerve stimulator, the galvanic cell comprising:

a casing;

a cathode unit having at least one electrode and, when a plurality of electrodes are provided, the electrodes of the plurality are separated and are electrically connected to one another, which at least one electrode of the cathode unit is comprised of a mixture of at least one metal oxide and at least one lead compound, which mixture is selected from the group consisting of:

(a) a mixture of $CrO_x$ in which x ranges between 2.5 and 2.7 and at least one lead compound which is selected from the group consisting of $PbCrO_4$, $PbMoO_4$ and PbO, (b) a mixture of $CrO_x$ in which x ranges between 2.5 and 2.7, $MnO_2$, and at least one lead compound which is selected from the group consisting of $PbCrO_4$, $PbMoO_4$ and PbO, and (c) a mixture of $MnO_2$ and a lead compound which is PbO;

an anode unit having at least one electrode comprised of an alkali metal and, when a plurality of electrodes are provided, the electrodes of the plurality are separated and are electrically connected to one another, which at least one electrode of the anode unit is placed one of near the at least one electrode of the cathode unit or between respective electrodes of the cathode unit; and an organic electrolyte comprised of a mixture of (a) at least one carbonate selected from the group consisting of ethylene carbonate and propylene carbonate, (b), 2-dimethoxyethane, and (c) a conducting salt.

2. The galvanic cell according to claim 1, wherein the casing includes a bottom, a cover, and sealing means positioned between the bottom and the cover for hermetically sealing the galvanic cell from external environmental influences, and wherein the bottom and the cover of the casing are comprised of metal and are electrically conductive.

3. The galvanic cell according to claim 1, wherein the casing is electrically conductive and is connected electrically to the anode unit, wherein the electrodes of the plurality of electrodes of the cathode unit are electrically connected to one another in parallel, and wherein the electrodes of the plurality of electrodes of the anode unit are electrically connected to one another in parallel.

4. The galvanic cell according to claim 1, further comprising at least one separator positioned between the at least one electrode of the anode unit and the at least one electrode of the cathode unit, wherein the at least one separator is electrically insulating, and wherein the at least one separator is porous and is impregnated with the organic electrolyte.

5. The galvanic cell according to claim 1, wherein the at least one electrode of the cathode unit further comprises a binder and at least one additive which is electrically conductive and which is selected from the group consisting of carbon black, acetylene black, and graphite.

6. The galvanic cell according to claim 1, wherein the at least one electrode of the cathode unit is porous and has a porosity ranging between about 30 and about 50%.

7. The galvanic cell according to claim 6, wherein the at least one electrode of the cathode unit is impregnated with the organic electrolyte.

8. The galvanic cell according to claim 1, wherein the alkali metal of the at least one electrode of the anode unit is lithium.

9. The galvanic cell according to claim 1, wherein the organic electrolyte comprises:

from about 20 to about 60% of ethylene carbonate;

from about 5 to about 20% of propylene carbonate; and from about 30 to about 70% of, 2-dimethoxyethane.

10. The galvanic cell according to claim 1, wherein the conducting salt of the organic electrolyte is $LiClO_4$, and wherein the conducting salt is present in an amount ranging from about 0.8 to about 1.5 mol/l.

11. The galvanic cell according to claim 1, wherein the galvanic cell has an open circuit voltage having a mean slope, wherein the galvanic cell has a capacity and an end of discharge characteristic such that at least 10% of capacity remains at a time just before reaching the end of discharge, and wherein the at least one lead compound is present in all amount in the mixture of the at least one electrode of the cathode unit so that the mean slope of the open circuit voltage after the time just before reaching the end of discharge is greater than the mean slope prior to the time just before reaching the end of discharge.

12. The galvanic cell according to claim 11, wherein the at least one lead compound is present in the mixture of the at least one electrode of the cathode unit in an amount ranging from about 3 to about 15 mol %.

* * * * *